United States Patent [19]
Cloud et al.
[11] Patent Number: 5,024,798
[45] Date of Patent: Jun. 18, 1991

[54] METHOD AND APPARATUS FOR MAKING A JUMPER CONNECTOR

[75] Inventors: Randy G. Cloud, Painesville; David A. Pretchel, Madison, both of Ohio

[73] Assignee: Minnesota Mining & Manufacturing Company, Saint Paul, Minn.

[21] Appl. No.: 411,663

[22] Filed: Sep. 25, 1989

Related U.S. Application Data

[62] Division of Ser. No. 901,762, Aug. 28, 1986, Pat. No. 4,869,684.

[51] Int. Cl.[5] ..................... B29C 41/20; B29C 41/38; B29C 45/14

[52] U.S. Cl. .............................. 264/272.15; 264/277; 425/117; 425/123; 425/127

[58] Field of Search ................. 29/257, 258, 883, 749, 29/860, 747; 264/271.1, 272.11, 272.14, 272.15, 275, 277, 279, 425/542, 116, 117, 123, 127; 439/402, 736, 405

[56] References Cited

U.S. PATENT DOCUMENTS

| | | | |
|---|---|---|---|
| 2,759,223 | 8/1956 | Delcamp | 264/277 |
| 3,521,221 | 7/1970 | Lenaerts et al. | 439/402 |
| 4,030,799 | 6/1977 | Venaleck | 339/405 |
| 4,067,951 | 1/1978 | Fleming et al. | 264/275 |
| 4,084,877 | 4/1978 | Knickerbocker | 439/402 |
| 4,260,209 | 4/1981 | Zell et al. | 439/402 |
| 4,314,960 | 2/1982 | Hass | 264/272.15 |

FOREIGN PATENT DOCUMENTS

| | | | |
|---|---|---|---|
| 2063758A | 6/1981 | United Kingdom | 264/275 |

*Primary Examiner*—Willard E. Hoag
*Attorney, Agent, or Firm*—Renner, Otto, Boisselle & Sklar

[57] ABSTRACT

Method and apparatus for making multiconductor electrical cable termination assembly and method of making the same having an integral structural combination of a multiconductor electrical cable, a plurality of electrical contacts, and a housing part that is molded about at least a portion of each of the contacts and a portion of the cable. Each contact forms a function with a respective conductor of the cable, and the integral housing part is molded with the assistance of a mold core under elevated temperature and pressure conditions so that each of the junctions is fully encapsulated by the molded body part to create a hermetically sealed junction zone which is free of air, moisture, oxygen, and other like deleterious contaminants, and which helps to prevent the contamination of the function when the cable termination assembly is utilized in a hostile environment.

8 Claims, 2 Drawing Sheets

METHOD AND APPARATUS FOR MAKING A JUMPER CONNECTOR

This is a division of copending application Ser. No. 06/901,762 filed on Aug. 28, 1986, now U.S. Pat. No. 4,869,684 issued on Sept. 26, 1989.

The present invention relates to improvements in electrical connectors such as cable terminations and cable termination assemblies and in a method of making the same. More specifically, the present invention consitutes an improvement over the multiconductor electrical cable termination and the methods of producing the same which are disclosed in U.S. Pat. No. 4,030,799 entitled "Jumper Connector". The entire disclosure of such patent is hereby incorporated by reference.

BACKGROUND

In the art of electrical connectors for cables, the term cable termination typically means the connector that is or can be used at the end or at an intermediate portion of a cable to connect the conductors thereof to an external member, such as another connector, cable termination, printed circuit board or the like. A cable termination assembly is usually referred to as the combination of a cable termination with an electrical cable. Sometimes such terms are used interchangeably, depending on context.

Multiconductor electrical cable termination assemblies have been available to the electrical industry for a number of years. These cable termination assemblies have been available both in the unassembled form requiring mechanical assembly thereof which includes the mechanical clamping of the termination properly to secure the various elements of the termination and cable, and also as a permanent pre-assembled and molded integral structural combination. In both cases the junctions or connections of contacts with respective conductors are made by part of the contacts piercing through the cable insulation to engage a respective conductor; such connections are referred to as insulation displacement connections (IDC). Unfortunately, the mechanically assembled types of prior art cable terminations do not provide a hermetic seal which surrounds the junctions formed between the cable conductors and contacts of a termination so as to completely encapsulate the junction and prevent the contamination thereof. Also, even in the directly molded integral structural combination IDC cable termination assemblies it may be the case that one or more of the IDC junctions is not fully encapsulated in the molding material.

SUMMARY OF THE INVENTION

In the present invention a multiconductor electrical cable termination assembly is formed as an integral structural combination of the multiconductor electrical cable, a plurality of electrical contacts, and a housing part that is molded about at least a portion of each of the contacts and a portion of the cable. Each contact forms a junction with a respective conductor of the cable, and the integral housing part includes a molded junction zone that includes a substantial depth of molding material at each contact to assure encapsulation of the IDC junctions and preferably of the entire IDC end of the contacts. Moreover, such housing part preferably is molded under elevated temperature and pressure conditions so that each of the junctions is fully encapsulated by the molded body part to create a hermetically sealed junction zone which is free of moisture, air, oxygen, and other like deleterious contaminants, and which helps to prevent the contamination of the junction when the termination is utilized in a hostile environment, for example, an environment which is either acidic or basic. The contacts and the conductors, therefore, may be of dissimilar metals, which will not corrode, oxidize or undergo any electrolysis-like activity due to the lack of moisture, oxygen, and the like, at the junctions. Furthermore, the molded housing part preferably is of a material compatible with that of the electrical insulation of the cable so as to bond chemically therewith to provide an effective strain relief for the termination and also to insure the integrity of the encapsulation of the junctions. It will be appreciated that the contacting portion of each electrical contact, i.e., the portion being intended for electrical connection to a device other than the cable of the termination, may be of various designs for connection, for example, with pin contacts, female contacts, e.g., fork contacts, conductive paths on a printed circuit board, etc.

The present invention provides encapsulation of the IDC ends of contacts in an IDC cable termination assembly. While the exposure of the IDC ends of the contacts can provide an advantage of probing the same, encapsulation of the IDC ends of the contacts can prevent inadvertent short circuit or incorrect connections to exposed IDC ends of the contacts, although the mentioned probability capability could be eliminated. Advantageously, though, such encapsulation further can eliminate the possibility that a probe inserted to the exposed IDC ends of the contacts might mechanically damage the IDC connection of a conductor and contact.

The invention further provides for a method of producing the cable termination assembly which utilizes an injection molding machine having molds equipped with a core that provides a cavity into which molding material may flow to produce the hermetically sealed junction zone described above. The core, which is preferably mounted within the side wall of one of the molds of a mold set, serves to urge the cable conductors toward the contacts to form respective IDC connections as the mold is closed. The core also serves to support the conductors in their proper position relative to their respective electrical contacts during the turbulent injection of plastic or the like into the cavity formed by the mold set, and to ensure the free flow of the plastic (or other molding material) above and about the conductors and their respective electrical contacts to create a hermetically sealed junction zone.

With the foregoing in mind it a primary object of the invention to provide a multiconductor electrical cable termination assembly improved in the noted respects.

Another object of the invention is to maintain the IDC junctions between the terminals and conductors of a multiconductor electrical cable termination assembly free of moisture, oxygen, and other deleterious contaminants.

A further object of the invention is to provide a multiconductor electrical cable termination assembly which can withstand a hostile environment.

These and other objects and advantages of the present invention will become more apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF PREFERRED EMBODIMENT

Figure 1:
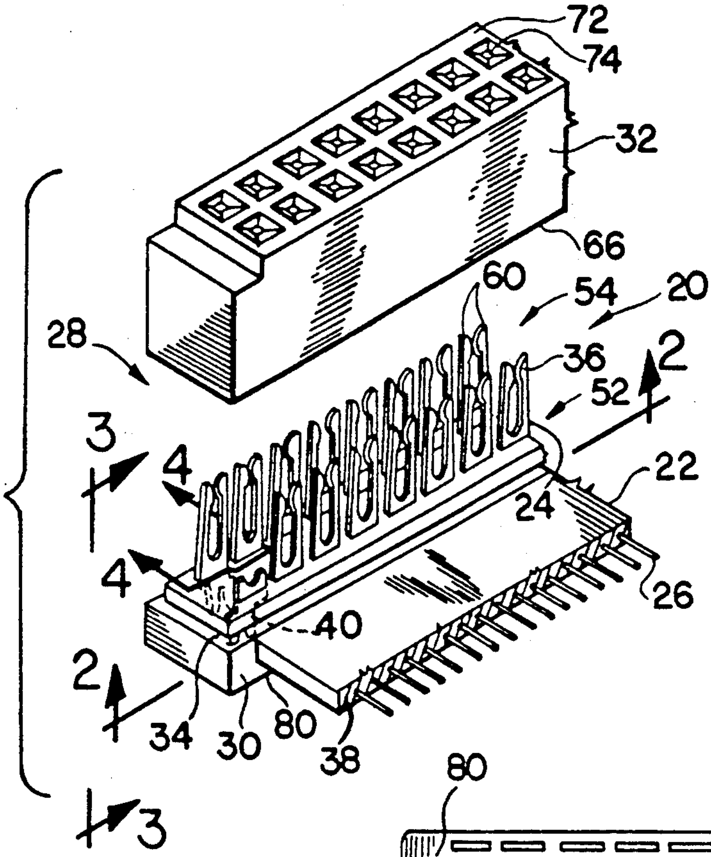
FIG. 1 is an exploded isometric view of the multiconductor electrical cable termination assembly in accordance with the invention.
Figure 2:
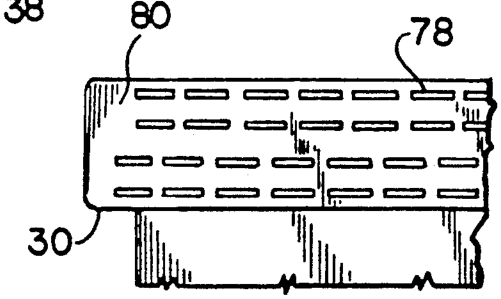
FIG. 2 is a bottom view of the molded housing part of FIG. 1 looking in the direction of line 2—2 thereof.

Referring to the drawings and initially to FIGS. 1-5 there is illustrated a multiconductor electrical cable termination assembly 20 made in accordance with the present invention. The fundamental parts of the cable termination assembly 20 include a multiconductor electrical cable 22, a plurality of electrical contacts, one of which is indicated at 24, for connection at respective junctions to the respective conductors 26 of electrical cable 22, and a housing 28 having a base body part 30 molded about at least a portion of each of the contacts 24 and a portion of the electrical cable 22 to form an integral structure therewith.

As illustrated, in the preferred embodiment of the invention the housing 28 also includes a cover 32 adapted to fit onto the base 30 at peripheral step 34 of the latter for appropriate containment of the contacting portions 36 of the electrical contacts 24; however, it will be appreciated that the form of the cover 32 and its possible elimination will depend on the particular style of the contacting portions 36. For example, as the illustrated contacts 24 are female fork or wiping type, the cover 32 is needed to guide external pin contacts to engage such contacts 24; whereas if the contacts 24 and contacting portions 36 thereof were simply pin contacts to be soldered in plated through openings of a printed circuit board or the like rather than the illustrated fork-like style, the cover 32 can be eliminated from the cable termination 20.

The base may be of plastic or of other material that preferably is able to be formed by plastic injection molding techniques. Such material may include a filler, such as fiberglass for strength or other characteristics. Preferably, the composition of the material of which the base 30 is formed and the composition of the electrical insulation 38, which separates and maintains the conductors 26 in parallel spaced-apart relation, are compatible or soluble in one another so that when the base 30 is molded it will chemically bond to the insulation 38 further to increase the integrity of the structure of the cable termination 20. The base 30 also provides a molded strain relief that separation of the contact terminal portions 40 from their respective junctions 42 with the conductors 26, which are seen most clearly illustrated in FIG. 4.

The terminal portion 40 of each electrical contact 24 preferably includes a pair of elongate prong-like arms 44 commonly supported from a base portion 46 and defining a relatively narrow slot 48 therebetween. The ends of the arms 44 remote from the base portion 46 preferably are tapered or chamfered to define an entranceway into the narrow slot 48 and to form generally pointed tips to piece easily through the electrical insulation 38 to create the desired IDC (insulatioan displacement connection). The width of the narrow slot 48 is preferably narrower than the normal diameter of the conductor 26. Therefore, as a typical electrical contact 24 is joined with cable 22 by urging the two toward each other, the pointed tips 50 pierce through the insulation 38 while the wide chamfered entranceway guides the conductor 26 into the narrow slot 48. As the conductor 26 enters the slot 48, it is somewhat flattened to provide a relatively enlarged surface area of engagement or connection with the two arms 44.

Figure 4:
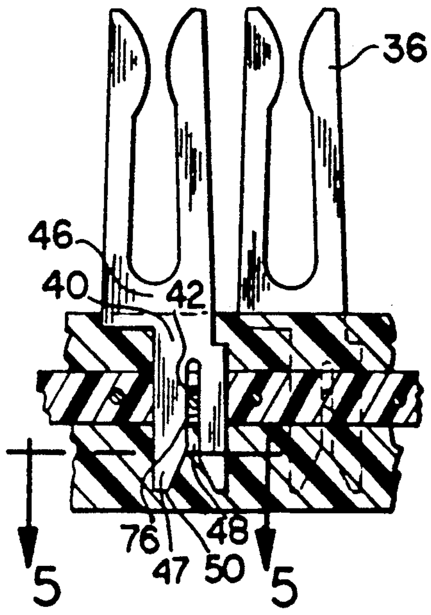
FIG. 4 is a fragmentary cross-sectional view of the multiconductor electrical cable termination assembly of FIG. 1 taken generally along line 4—4 thereof.

The terminal portion 40 of each electrical contact 24 is in the same plane and is offset with respect to the contacting portion 36 thereof, as can be seen most clearly in FIGS. 1 and 4. As seen particularly in FIG. 1, the electrical contacts 24 in the forward row 52 have their terminal portions offset to the left with respect to their contacting portions, and the electrical contacts in the rearward row 54 have their terminal portions offset to the right with respect to the contacting portions. This offset configuration of the electrical contacts 12 allows them to be of reasonable size and strength while the contacting portion of each contact in one row is directly aligned with the contacting portion of an opposite contact in the other row and with each of the relatively closely positioned parallel conductors 26 being connected to only a single respective contact 24. It will be appreciated that although the illustrated invention utilizes two rows of contacts, the principles of the invention may be, of course, employed in terminations having one row or more than two such rows of contacts or any other arrangement thereof.

As illustrated in FIG. 1, in the preferred embodiment each of the electrical contacts 24 is of the fork contact type whereby each of the contact portions 36 comprises a pair of generally elongate arms 60 adapted for electrical and mechanical connection with a pin contact, for example, inserted therebetween. The housing cover 32 is preferably separately produced from a dielectric material such as, for example, plastic and includes a plurality of chambers (not illustrated) therein for individual containment of the arms 60. The housing cover 32 has an outer wall 32 open at the bottom 66 to receive respective pairs of contact arms 60 within the chambers. The cover top 72 includes a plurality of apertures 74 for providing access to and guiding respective pin contacts or the like into the respective chambers surrounding the two arms 60 of the respective contacts 24 for mechanical and electrical engagement therewith. Preferably, the opening at the cover bottom 66 includes a step which forms an inverted image of the step 34 of base 30 so as to facilitate a stable and secure fit between the cover 32 and the base 30. Upon the assembly of the cover 32 to base 30 the two elements may be securely bonded to one another utilizing various techniques such as, for example, ultrasonic welding techniques.

Figure 3:
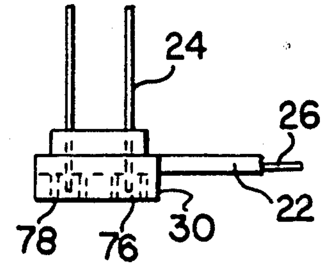
FIG. 3 is an end elevation view of the multiconductor electrical cable termination assembly of FIG. 1 looking in the direction of line 3—3 thereof.
Figure 5:
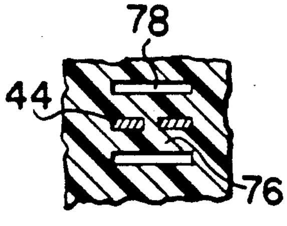
FIG. 5 is a fragmentary cross-sectional view of the multiconductor electrical cable termination assembly of FIG. 4 taken generally along line 5—5 thereof.

Referring now to FIGS. 3–5 the details of the base 30 molded about at least a portion of each of the contacts 24 and a portion of the cable 22 are made more clearly evident. Specifically, as provided by the present invention, the junctions 42 between the two arms 44 of the contact terminal portions 40 and the conductors 26 are illustrated as being totally surrounded and encapsulated by the plastic from which the base 30 is produced to form a hermetically sealed junction area or zone 76 completely free of any air pockets and gaps, moisture, or other like contamination.

In the preferred form of the invention the hermetically sealed junction zone 76 is assured not only by molding together the base 30, contacts 24, and cable 22 in an injection molding machine having elevated operating temperatures and pressures, but also by using an injection molding machine having molds equipped with a core 77 which allows the injected plastic to flow freely during the injection molding process around the two arms 44 and the conductors 26 to form the hermetically sealed junction zone 76. Hermetically sealed junction zone 76 essentially eliminates the formation of corrosion, oxidation, or electrolysis-like activity at junction 42 regardless of the material from which the conductors 26 and contacts 24 may be produced and irrespective of the atmosphere to which the cable termination 10 may be subjected. Therefore, the relatively expensive or plated conductors 26 may be effectively terminated, for example, by less expensive aluminum electrical contacts 24. Similarly, cable termination 10 may be effectively utilized, for example, in basic, acidic, or similarly contaminated environments which prior art terminations are incapable of tolerating. During the molding process, the core produces the core openings 78 in the bottom 80 of the base 30, as is described further below.

Referring now to FIGS. 6–9 there is illustrated a portion of the core 77 suitable for use in producing the cable termination assembly 20 illustrated in FIGS. 1–5. The core 77, which is preferably mounted within the side wall of an injection mold 84, includes a plurality of protruding legs 86 each having straight inner 88, outer 90, and end 92 surfaces that cooperate to form rectangular-shape cavities 94 therebetween to surround the ends of the legs 44 protruding beyond the insulation 38.

In the process of forming the base 30, the contacts 24 are placed into openings 87 in matching mold 96 which mates with mold 84 and maintains the contacts 24 in their proper position during the IDC and injection molding processes. After the contacts 24 are inserted into the openings 87 in mold 96, the cable 22 is positioned relative to the IDC arms 44 of the contacts 24 to align the conductors 26 relative to the contacts. Then the opposing molds 84 and 96 are brought toward one another. Preferably, as the molds are being brought together and sealed, the end surfaces 92 of the legs 86 force the insulated conductors 26 between the respective legs 44 of the contacts 24 creating IDC junctions 42. The spacing of the two inner walls 88 on opposite sides of the cavity 94 preferably is small enough to assure that relative movement of the cable 22 and contacts 24 upon closure of the mold parts or halves 84, 96 will cause good IDC connections to be made between the respective cable conductors 26 and contacts 24.

Figure 6:
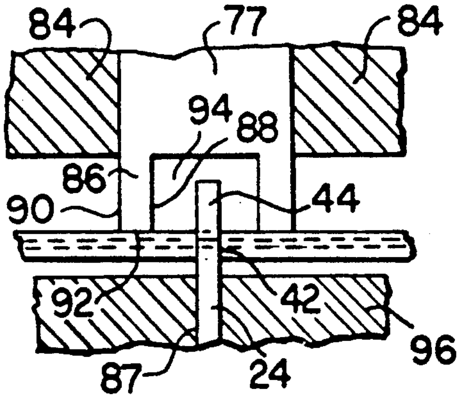
FIG. 6 is a fragmentary cross-sectional view of the molds and core according to the present invention which may be used to produce the housing base of the multiconductor electrical cable termination assembly of FIG. 1.
Figure 7:
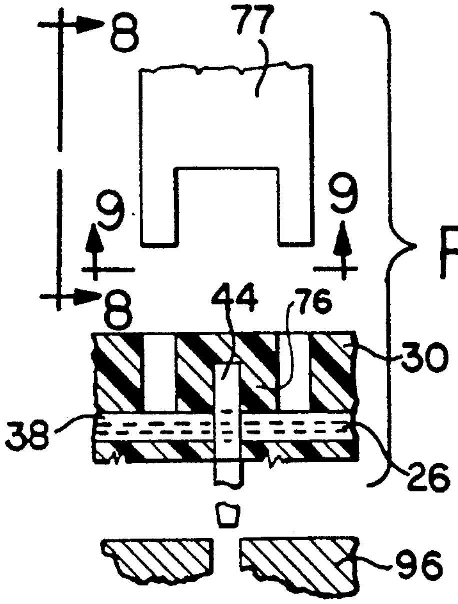
FIG. 7 is a fragmentary cross-sectional view of one of the molds and the core of FIG. 6 after the base of the multiconductor electrical cable termination assembly has been formed.
Figure 8:
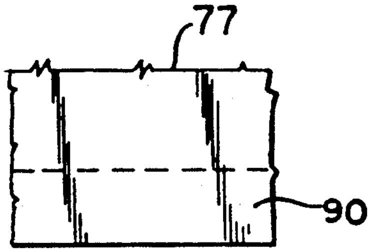
FIG. 8 is a fragmentary end view of the core of FIG. 7 looking generally in the direction of line 8—8 thereof.

When the molds 84 and 96 are properly mated and sealed the cavity formed therebetween is then injected with plastic or other suitable material. During injection the core 77 helps to support the cable 22 and conductors 26 in their proper position relative to respective contacts 24, as is seen in FIG. 6, preventing the dislodgement of the junctions 46, which otherwise might too easily result due to the turbulence generated during injection. Core 77 further ensures that the injected plastic flows freely above and about junctions 42 creating the hermetically sealed junction zones 76. The spacing between walls 88 on opposite sides of the cavity 94 is adequate to permit flow of plastic into such cavity above the cable (as is seen in FIGS. 6 and 7) to achieve good encapsulation of the IDC ends or arms 44. Finally, when the injected plastic has sufficiently solidified, the molds 84 and 96 may be separated and the newly formed base 30 with its integrally molded cable and contacts located therein may be removed from the mold cavity.

It will be appreciated that although in the previously illustrated embodiment of the invention the two arms 44 of the terminal portion 40 have been completely surrounded and encapsulated by the plastic, a cable termination may be produced in accordance with the present invention wherein the distal ends of the arms 44 including the pointed tips 50 are not surrounded with plastic, but are instead left open and exposed, possibly to facilitate the testing of each of the junctions while the termination is connected, for example, to another connector, computer, printed circuit board, or the like. Such exposure can be achieved by altering the shape of the cavity 94. Of course, in order to maximize hermetic sealing of the junction zone, the arms 44 should be completely surrounded by the plastic as illustrated.

Figure 10:
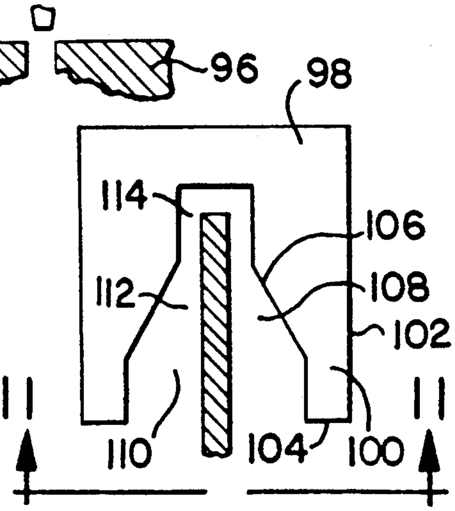
FIG. 10 is a fragmentary elevational view of an alternate embodiment of a core according to the present invention which may be used to produce the base of the multiconductor electrical cable termination assembly of FIG. 1.
Figure 9:
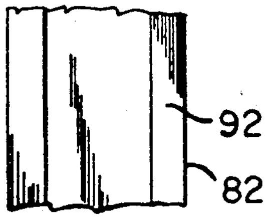
FIG. 9 is a fragmentary bottom view of the core of FIG. 7 looking generally in the direction of line 9—9 thereof.
Figure 11:
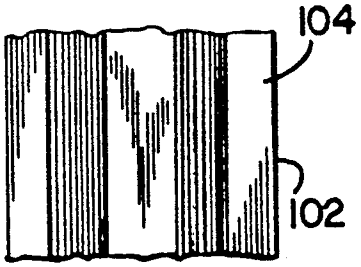
FIG. 11 is a bottom view of the core of FIG. 10 looking generally in the direction of line 11—11 thereof.

Referring now to FIGS. 10 and 11, there is illustrated an alternative embodiment of a portion of a core 98 suitable for use in producing a cable termination assembly made in accordance with the present invention. Core 98 comprises a plurality of legs 100 having straight outer 102 and end 104 surfaces, and multifaced inner surfaces 106 which cooperate to form cavities 108 having wide mouths 110, narrowing midsections 112, and reduced end sections 114. Such a unique configuration has been found to minimize further the undesirable turbulent flow effects which manifest themselves during the injection process, thus further ensuring that the junctions are not dislodged or disturbed. For example, the wide mouth 110 assures adequate flow of plastic above the cable to seal the IDC junction zone 42. The narrow end section 114 of the core 98 provides alignment stability for the contact 24 IDC arms 44 during the molding process. Furthermore, the sloping, tapering or narrowing midsection 112 both helps guide the IDC arms 44 and tips 50 thereof properly into the narrow section 114 and a tapering down of the molded plastic to avoid sharp edges that could too easily break.

While the invention is illustrated and described above with reference to multiconductor electrical cable termination 20 located at an end of the multiconductor electrical conductor 11, it will be apparent that such a termination also may be provided in accordance with the invention at a location on a multiconductor electrical cable intermediate the ends thereof.

Although the invention has been shown and described with respect to a certain preferred embodiment, it is obvious that equivalent alterations and modifications will occur to others skilled in the art upon the reading and understanding of this specification. The present invention includes all such equivalent alterations and modifications, and is limited only by the scope of the following claims.

We claim:

1. A method of producing in a molding machine a multiconductor electrical cable termination having a plurality of electrical contacts mounted within a base each connected by an electrical junction to the respective conductor of a multiconductor electrical cable, said method comprising the steps of supporting such plurality of electrical contacts within the open mold cavity of such molding machine, placing such multiconductor electrical cable in proper alignment upon such plurality of electrical contacts, forcing the mold parts of the molding machine together simultaneously to close the mold cavity and to form such electrical junctions between such electrical contacts and such respective conductors, the mold parts including a plurality of legs operative during of the mold engage the electrical cable to drive the cable against the electrical contacts to form the electrical junctions between the contacts and respective conductors in the cable, adding a molding material to such closed mold cavity, such mold parts allowing the molding material to flow freely with the material flowing freely between the legs and contacts in the regions of the electrical junctions so that the material surrounds and contains each of the electrical junctions to form such multiconductor electrical cable termination having a hermetically sealed junction zone surrounding each of such electrical junctions, allowing such molding material to solidify, and separating the mold parts of such molding machine to allow the removal of such multiconductor electrical cable termination.

2. The method of claim 1, said contacts having insulation displacement connection portions, said forming of electrical junctions comprising using plural cores to effect relative movement of the cable and contacts to achieve insulation displacement connections thereof, and causing molding material to flow into volumes in such cores to enclose such insulation displacement connection portions of such contacts.

3. A method of producing a multiconductor electrical cable termination as set forth in claim 2, wherein such molding machine comprises an injection molding machine and said step of adding a molding material to such closed cavity comprises injecting a liquefied molding material into such closed cavity at an elevated pressure and temperature.

4. A method of producing a multiconductor electrical cable termination as set forth in claim 2, wherein such cores include means to hold the contacts and the cable in relative position during molding and ensures that the molding material freely flows and contains each electrical junction such that each junction is contained within a hermetically sealed junction zone.

5. A core mounted within one-half of a two part mold defining the mold cavity of an injection molding machine for making a multiconductor electrical cable termination having a plurality of electrical junctions each surrounded and contained within a hermetically sealed junction zone, said core comprising a plurality of pairs of protruding legs each leg having a straight inner, outer, and end surface, said legs of each pair having the inner surfaces spaced to receive an electrical contact therebetween supported from the other half of the mold and having end surfaces positioned to engage an electrical cable to drive the cable against the electrical contact, such that the legs cooperate to form a plurality of rectangular shaped core openings in the molded material wherein during the injection process of such injection molding machine the material being injected can flow freely above and about such electrical junctions between said legs of each pair to form such hermetically sealed junction zones.

6. A core mounted within one-half of a two part mold defining the mold cavity of an injection molding machine for making a multiconductor electrical cable termination having a plurality of electrical junctions each surrounded and contained within a hermetically sealed junction zone, said core comprising a plurality of pairs of protruding legs each leg having a straight outer and end surfaces and a multifaced inner surface, said legs of each pair having the inner surfaces spaced to receive an electrical contact therebetween supported from the other half of the mold and having end surfaces positioned to engage an electrical cable to drive the cable against the electrical contact, such that said legs cooperate to form a plurality of core openings having wide mouths, narrowing midsections, and reduced end sections wherein during the injection process of such injection molding machine the material being injected can flow freely above and about such electrical junctions between said legs of each pair to form such hermetically sealed junction zones.

7. A molding machine comprising a mold defining a cavity for containing therein contacts and a multiconductor electrical cable to form a multiconductor cable termination by molding a base about at least part of such contacts and cable and a core for mounting within the mold of the injection molding machine for making a multiconductor electrical cable termination having a plurality of electrical junctions each surrounded and contained within a hermetically sealed junction zone, said core comprising a plurality of protruding legs each having a straight inner, outer, and end surface which cooperate to form a plurality of rectangular shaped cavity spaces wherein during the injection process of such injection molding machine the material being injected is allowed to flow freely above and about such electrical junctions to form such hermetically sealed junction zones.

8. A molding machine comprising a mold defining a cavity for containing therein contacts and a multiconductor electrical cable to form a multiconductor cable termination by molding a base about at least part of such contacts and cable and a core for mounting within the mold of the injection molding machine for making a multiconductor electrical cable termination having a plurality of electrical junctions each surrounded and contained within a hermetically sealed junction zone, said core comprising a plurality of protruding legs each having a straight outer and end surfaces and a multi-faced inner surface such that said legs cooperate to form a plurality of cavity spaces having wide mouths, narrowing midsections, and reduced end sections wherein during the injection process of such injection molding machine the material being injected is allowed to flow freely above and about such electrical junctions to form such hermetically sealed junction zones.

* * * * *

UNITED STATES PATENT AND TRADEMARK OFFICE

CERTIFICATE OF CORRECTION

PATENT NO. : 5,024,798

DATED : June 18, 1991

INVENTOR(S) : Randy G. Cloud, et al.

It is certified that error appears in the above-identified patent and that said Letters Patent is hereby corrected as shown below:

Abstract, penultimate line, "function" should read --junction--.
Col. 2, line 53, after "it" insert --is--.
Col. 4, line 20, before "separation" insert --precludes--.
Col. 4, line 31, "piece" should read --pierce--.
Col. 7, line 35, after "during" insert --closing-- and after "mold" insert --cavity to--.

Signed and Sealed this

Thirtieth Day of March, 1993

*Attest:*

STEPHEN G. KUNIN

*Attesting Officer*

*Acting Commissioner of Patents and Trademarks*